US006328919B1

(12) United States Patent
Pham et al.

(10) Patent No.: US 6,328,919 B1
(45) Date of Patent: Dec. 11, 2001

(54) METHOD FOR EXTRUDING POLYCARBONATE OF LOW BULK DENSITY

(75) Inventors: Hoang T. Pham; Richard O. Kirk, both of Lake Jackson, TX (US); Paul D. Haemhouts, Antwerp (BE)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/251,014

(22) Filed: Feb. 16, 1999

(51) Int. Cl.[7] .............................. B29C 47/62; B29C 47/76
(52) U.S. Cl. .................. 264/177.1; 264/211.21; 264/211.23; 264/349; 425/208
(58) Field of Search ............................ 264/176.1, 211.21, 264/211.23, 177.1, 349; 425/205, 208; 366/89, 323

(56) References Cited

U.S. PATENT DOCUMENTS

| 3,632,254 | * | 1/1972 | Woodham et al. . |
| 3,712,776 |   | 1/1973 | Woodham et al. . |
| 3,852,387 | * | 12/1974 | Bortnick et al. . |
| 3,954,713 | * | 5/1976 | Schnoring et al. . |
| 4,013,745 | * | 3/1977 | Brinkmann et al. . |
| 4,357,291 |   | 11/1982 | Miller et al. . |
| 4,367,190 | * | 1/1983 | Beach . |
| 4,461,734 |   | 7/1984 | Jones et al. . |
| 4,501,498 |   | 2/1985 | McKelvey . |
| 4,616,989 | * | 10/1986 | Mewes et al. . |
| 4,729,666 | * | 3/1988 | Takubo . |
| 4,867,927 | * | 9/1989 | Funaki et al. . |
| 4,944,906 | * | 7/1990 | Colby et al. . |
| 5,597,525 | * | 1/1997 | Koda et al. . |

FOREIGN PATENT DOCUMENTS

| 01 144 932 B1 | 6/1985 | (EP) . |
| 873844 | 10/1998 | (EP) . |
| 2 076 728 | 12/1981 | (GB) . |

OTHER PUBLICATIONS

Plastics Engineering handbook (PEH) (1976) pp. 159–174.*
"Polymer Extrusion", C. Rauwendaal, 1990, pp. 168–170.

* cited by examiner

*Primary Examiner*—Mark Eashoo

(57) ABSTRACT

A process for reducing polymer surging, lowering pressure and temperature fluctuations, and reducing polymer degradation while providing good overall throughput rate when plasticating and extruding low bulk density polycarbonate materials. The process involves a two-stage extrusion screw having a feed section with a constant channel depth of at least about 12 percent of the screw diameter and a transition section having a compression ratio of at least about 3:1. Thermoplastic low bulk density polycarbonate materials are extruded through a die in the shape of sheets, profiles, or films.

13 Claims, 2 Drawing Sheets

METHOD FOR EXTRUDING POLYCARBONATE OF LOW BULK DENSITY

FIELD OF THE INVENTION

The present invention relates to methods and apparatuses useful for the plastication and extrusion of low bulk density polycarbonate materials.

BACKGROUND OF THE INVENTION

Normal or conventional bulk density thermoplastic materials are commonly melt or heat plasticized and extruded as a molten stream through extrusion dies without considerable difficulty. The continuous single or twin screw extruders employed have rotary screws designed to plasticate the thermoplastic material being processed and to convey the molten polymer to and through a downstream extrusion die at a desired rate.

Conventional extruder screws have feeding, transition, and metering sections successively along their length. The feeding and transition sections are required to provide an over-supply of input molten polymer to the metering section which controls and limits the throughput rate of the over-all extruder. However, should it be desired to process low bulk density thermoplastic materials such as certain forms of polycarbonate or blends of such low bulk density polycarbonate materials with conventional bulk density thermoplastic materials problems are immediately encountered.

As employed herein, the term "conventional bulk density thermoplastic materials" is intended to denote thermoplastic materials having a bulk density in the normal bulk density range encountered with virgin or neat polymer in pellet or bead form. For example, virgin or regular thermoplastic material in pellet or bead form normally have a bulk density greater than about 0.5 grams per cubic centimeter ($g/cm^3$) and less than about 1.2 $g/cm^3$, for conventional bulk density polycarbonate materials this is typically about 0.5 $g/cm^3$ to about 0.75 $g/cm^3$. As employed herein, the term "low bulk density polycarbonate materials" is intended to denote polycarbonate materials having a bulk density less than about 0.5 $g/cm^3$. For example, virgin or neat polycarbonate can exist in a regularly shaped low bulk density granular form such as powder or as an irregularly shaped low bulk density form such as agglomerated granules having an appearance resembling "popcorn" and sometimes referred to as flake. Polycarbonate which has been previously processed then mechanically ground can exist in irregularly shaped low bulk density forms sometimes referred to as chip, scrap, regrind, or recycle.

During extrusion of regularly and especially irregularly shaped low bulk density polycarbonate materials or blends of such low bulk density polycarbonate materials with conventional bulk density thermoplastic materials, solids conveying in the screw feeding section is often inadequate to properly fill the screw and hence results in undersupplying the screw plasticating and metering sections. This results in polymer surging, lower throughput rates, high melt temperatures, and excessive polymer degradation. The term "extrudate quality" generally refers to the uniformity of the temperature, pressure, and composition of the extrudate at the dieface. If the extrudate is of low quality, temperature and pressure fluctuations are large and the flow of thermoplastic material through the die will be irregular and unsteady and the quality of the product degraded. An important determinant of an end product is how well its dimensions conform to specification. For example, in polycarbonate sheet variations in thickness greater than ±2 percent can degrade end product physical properties such as practical toughness and impact strength, end product aesthetics by causing such problems as undesirable roughness, variations in polish and/or appearance of wrinkles, and processability of the sheet in subsequent molding operations such as vacuum forming and thermoforming.

There have been attempts in the prior art to provide steady throughput rate from the metering section by modifying the feed section of the screw. For example, U.S. Pat. No. 4,461,734 reported a feed section with relatively deeper screw root depth and/or greater screw lead and/or greater screw length than normally employed in feeding sections of extruders handling virgin or high bulk density linear low density polyethylene (LLDPE). Although the modifications assisted in improving the throughput rate of the LLDPE flow throughout the process, a downstream melt pump, sometimes referred to as a rotary gear pump, was required to fully control the throughput rate of the over-all process. Further, the overall energy efficiency of a pump-extruder system may actually be lower than the extruder itself.

While melt pumps will make more uniform the volumetric flow of melted thermoplastic material through the die, experience has shown that passage through a melt pump will not significantly reduce temperature variations in the polymer. Hence a melt pump can only ensure that the volumetric flow rate of the extruder is uniform and if the extrudate has a large temperature variations in it, these will pass through the pump and appear at the die, where they can cause irregular flow and degrade product quality. Various techniques have been employed to minimize the temperature fluctuations such as providing internally heated extruder screws alone or in conjunction with motionless mixers after the melt pump as taught for styrene-butadiene elastomers in EP 0 144 932 B 1.

In view of the continuing need for high extrudate quality during heat plastication and extrusion of low bulk density polycarbonate materials, it would be desirable if there were provided methods and apparatuses which would reduce polymer surging, lower pressure and temperature fluctuations, and reduce polymer degradation while providing good overall throughput rates.

SUMMARY OF THE INVENTION

Accordingly, the present invention is directed to methods and apparatuses that reduce polymer surging, lower pressure and temperature fluctuations, and reduce polymer degradation while providing good overall throughput rates when plasticating and extruding low bulk density polycarbonate materials.

In one aspect this invention involves a single screw extruder for plasticating and extruding sheet, profile, or film from a thermoplastic material comprising a low bulk density polycarbonate material, said polycarbonate having a bulk density in the range of about 0.15 $g/cm^3$ to about 0.5 $g/cm^3$, whereby a constant throughput of plasticated material characterized by a steady head zone melt pressure maintained within about ±10 percent is provided to and through a die.

In another aspect this invention involves a single screw extruder for plasticating and extruding sheet, profile, or film from a thermoplastic material comprising a low bulk density polycarbonate material, said polycarbonate having a bulk density in the range of about 0.15 $g/cm^3$ to about 0.5 $g/cm^3$, comprising:

(a) a two-stage extruder screw comprising:
  (i) a feed section having a screw lead to diameter ratio greater than about 1 and a constant channel depth of at least about 12 percent of the screw diameter, (ii) a transition section having a compression ratio of at least about 3:1 and a length of at least about 5 turns, and (iii) a metering section which is at least about 3 turns long, (b) a hopper having an included cone angle of at least about 30°, (c) a feed throat opening through a barrel, said opening having an aspect ratio greater than about 1 and a width of at least about 1 times the inside diameter of the barrel, and (d) an extrusion die, whereby a constant throughput of plasticated material characterized by a steady head zone melt pressure maintained within about ±10 percent is provided to and through the die.

In a further aspect this invention involves a two-stage extruder screw comprising:

(a) a feed section having a screw lead to diameter ratio of greater than about 1 and a channel depth of at least about 12 percent of the screw diameter, (b) a first transition section having a compression ratio of at least about 3:1 and a length of at least about 5 turns, (c) a first metering section which is at least about 3 turns long, (d) optionally, a mixing section, (f) a venting section, (g) a second transition section, and (h) a second metering section.

In another aspect, this invention involves a method of plasticating and extruding sheet, profile, or film from a thermoplastic material comprising a low bulk density polycarbonate material, said polycarbonate having a bulk density in the range of about 0.15 g/cm³ to about 0.5 g/cm³, in a single screw extruder comprising the step of providing a constant throughput of plasticated material characterized by a steady head zone melt pressure maintained within about ±10 percent to and through an extrusion die.

In yet another aspect, this invention involves a method of plasticating and extruding sheet, profile, or film from a thermoplastic material comprising a low bulk density polycarbonate material, said polycarbonate having a bulk density in the range of about 0.15 g/cm³ to about 0.5 g/cm³, comprising the steps of:

(a) feeding the thermoplastic material through a hopper having an included cone angle of at least about 30°, (b) passing the thermoplastic material from the hopper through a feed throat opening in a barrel, said opening having an aspect ratio greater than about 1 and width of at least about 1 times the inside diameter of the barrel, (c) conveying the thermoplastic material in a feed section of a two-stage extruder screw, said feed section having a screw lead to diameter ratio of greater than about 1 and a constant channel depth of at least about 12 percent of the screw diameter, (d) plasticating the thermoplastic material in a transition section having a compression ratio of at least about 3:1 and a length of at least about 5 turns, (e) conveying the plasticated thermoplastic material in a metering section which is at least about 3 turns long, and (f) providing a constant throughput of plasticated material characterized by a steady head zone melt pressure maintained within about ±10 percent to and through an extrusion die.

DETAILED DESCRIPTION OF THE INVENTION

Figure 1:
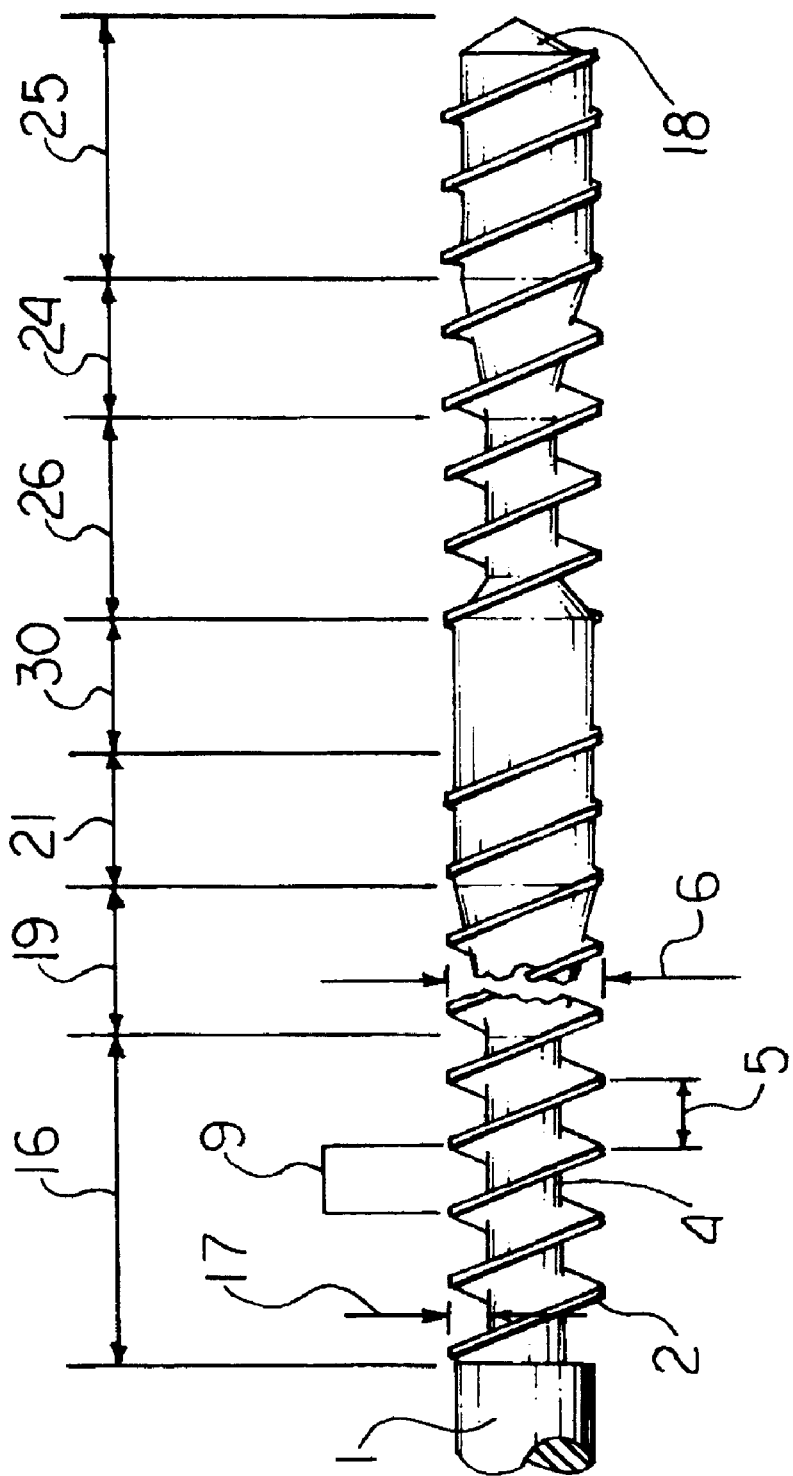
FIG. 1 is a vertical elevational schematic view of an extruder screw.
Figure 2:
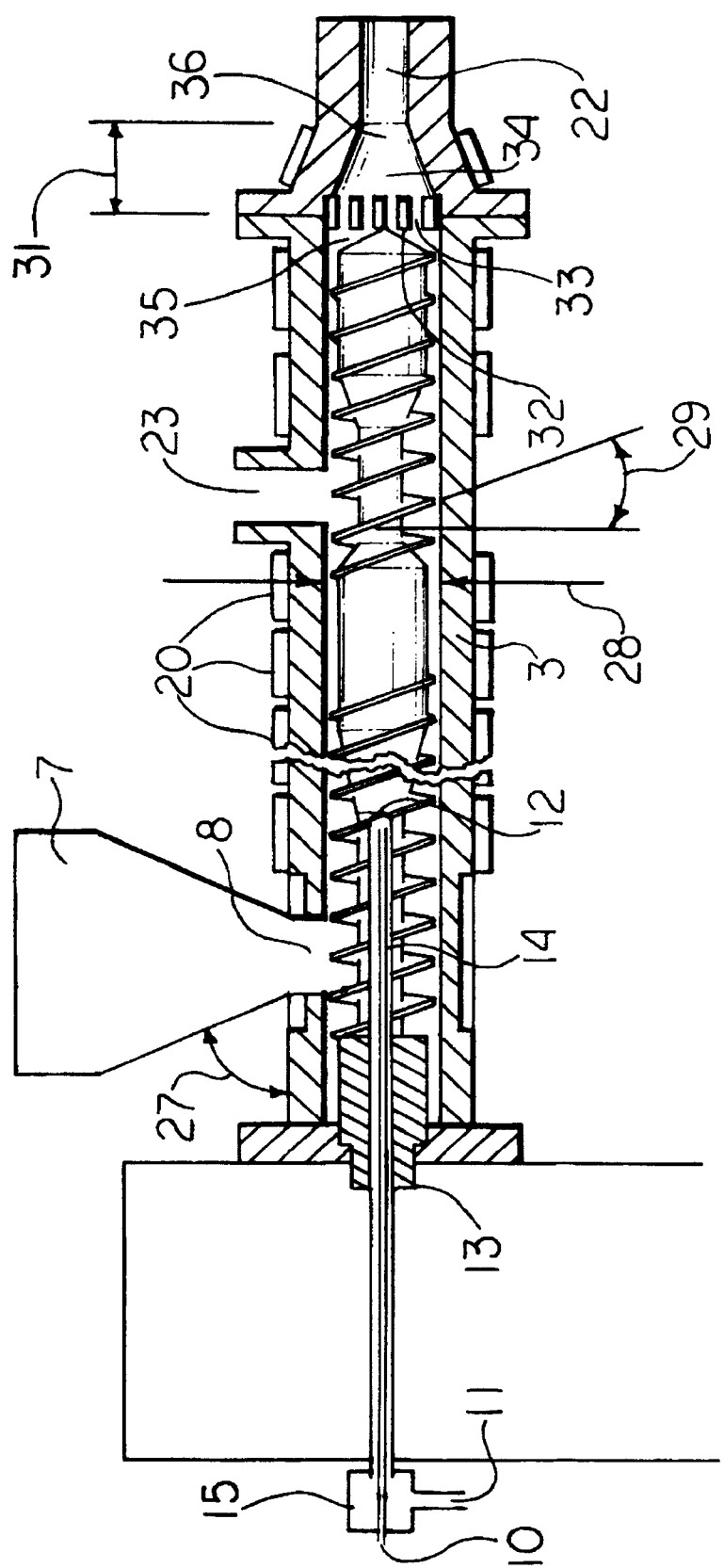
FIG. 2 is a vertical elevational schematic view of a vented screw extruder.

Polymeric materials may exist in a variety of different forms, some regularly shaped, such as powder, beads, and pellets and some irregularly shaped, such as flakes, chips, fibers, and strips. A polymeric material has a density, which is constant and is an inherent property of the material regardless of the shape of the physical form in which it exists. However, a polymeric material also has a bulk density, and this property is variable and is determined by the shape of the physical form in which it exists. Density may be defined as the mass of a continuous media of material per unit volume, whereas bulk density of a polymeric material may be defined as the mass of a noncontinuous media of the material divided by the volume occupied by the mass.

The present invention is directed to polycarbonate material. Preferably polycarbonate material having a bulk density of at least about 0.15 g/cm³, more preferably at least about 0.16 g/cm³, even more preferably at least about 0.17 g/cm³, even more preferably at least about 0.18 g/cm³, even more preferably at least about 0.19 g/cm³, and most preferably at least about 0.2 g/cm³ is used. Further, preferably a polycarbonate material having a bulk density less than about 0.5 g/cm³, more preferably less than about 0.46 g/cm3, even more preferably less than about 0.43 g/cm³, even more preferably less than about 0.4 g/cm³, even more preferably less than about 0.36 g/cm³, even more preferably less than about 0.33 g/cm³, and most preferably less than about 0.3 g/cm³ is used. Preferably the low bulk density polycarbonate material is irregularly shaped and more preferably it is an agglomerate and porous in nature with its longest dimension in the range of about 1 mm to about 50 mm with an average dimension of about 8 mm to 12 mm.

Thermoplastic polymeric material such as polycarbonate is useful for the fabrication of a variety of molded or shaped articles. Thermoplastic material must be heat softened to such an extent that it flows freely, sometimes referred to as plastication, to be molded, shaped, or extruded through a die. Extruders are a commonly used instrument for the plastication of polymeric material. In the case of polymeric material which is crystalline, plastication is synonymous with melting. In the case of polymeric material such as polycarbonate which is amorphous, plastication occurs at about the glass transition temperature ($T_g$).

Although the drawings illustrate an extruder screw, feed, and hopper means, it will be understood that the extruder screw, feed, and hopper means are utilized in their normal environment, i.e., in cooperative association with conventional frame means, horizontal vented barrel, and drive means which are not shown since they constitute well-known apparatus commercially available to the art. An extruder for use in processing polymeric material of the present invention is composed of a screw 1, a cylinder having one or more raised ridges, sometimes referred to as a flight 2, helically disposed thereabout, which screw rotates within an annular cylinder, or barrel 3. The surface of the screw above which the flight(s) are raised is the root of the screw 4. The axial distance of one full turn of the screw (or the distance from one flight to the next) is the screw lead 5.

Typically, the distance for one turn of the extruder screw is the same distance as the diameter of the screw 6. A hopper 7 directs polymeric material through a feed throat opening 8 in the barrel into contact with the screw and the space between the flight(s) and the interior wall of the barrel of the extruder, sometimes referred to as the screw channel(s) 9.

Optionally, the screw is water cooled to reduce feed problems such as bridging and sticking to the walls in the feed throat. Water flows in 10 and out 11 of the screw through piping attached to the downstream end or rear of the screw. The screw has a hole drilled down its center 12 to the depth to be cooled, and the hole is threaded to fit a pipe for the water exit line 13. Water is fed into the screw through a tube fitting loosely inside the pipe and drilled hole 14. The plumbing is assembled with a rotary union 15 allowing the screw to turn with the water flowing.

Typically, the screw has an initial or feed section 16 which begins the process of conveying the solid polymeric material forward within the barrel of the extruder, the direction of travel of the polymeric material as it is transported away from the hopper by the screw being considered the downstream direction. In this section of the screw the space between the root of the screw and the interior wall of the barrel, sometimes referred to as the root channel depth or just channel depth 17, is usually large enough to over-feed the screw. This is a desirable effect because the over-feeding action serves to compact and pressurize the polymeric material and form a solid bed of advancing material.

Channel depth is an important dimension of the screw. Typically, it is deepest in the screw section under the hopper, e.g., the feed section, and shallowest near the downstream end or screw tip 18. A few extruder screws are made with a gradual change of the channel depth from one end to the other. Such may be called a constant taper screw. Most screws, however, have at least three distinct sections of channel depth: a feed section, one or more transition sections, sometimes referred to as plasticating sections, and one or more metering sections, sometimes referred to as pumping sections. The length of a section may be expressed in several ways, for example in absolute numbers, e.g., 10 inches (25.4 centimeters), or in percentage of the extruder screw length (L), e.g., 50 percent of L, or in number of turns of the screw, e.g., 10 turns of the screw.

The feed section starts at the upstream end of the screw and has a constant channel depth. The feed section of the screw is typically followed, with or without intervening sections, by a transition section 19 sometimes referred to as the melting or the compression section in which plastication of the polymeric material occurs. The transition section starts where the channel begins to change, e.g. become shallower. It ends where a constant depth is reached again. Plastication of the polymeric material occurs as a result of the combined effect of heat produced by heater bands mounted on the outside of the extruder barrel 20 and the shearing forces to which the screw subjects the polymeric material causing friction between the internal wall of the extruder barrel and the polymeric material. The transition section of the screw is typically followed, again with or without intervening sections, by a metering section 21 which functions to pump the plasticated material, as extrudate, out through the downstream end of the extruder which is typically a die 22 or some other form of restricted orifice. The metering section has a constant channel depth.

Sometimes extruder screws are described in terms of their compression ratio. Compression ratio is related to channel depths. A very simple and convenient measure of this is the channel depth ratio which is equal to the depth of the channel in the first turn at the upstream end of a transition section divided by the depth of the channel in the final downstream turn of the transition section. An extruder screw comprising one or more transition sections may have one or more compression ratios. For a transition section where the channel depth becomes shallower in the downstream direction of the screw the compression ratio is greater than one. For a transition section where the channel depth becomes deeper in the downstream direction of the screw the compression ratio is less than one.

A preferred extruder for processing low bulk density polycarbonate material is a vented extruder. A vented extruder is equipped with one or more openings (vent ports) in the extruder barrel 23, through which volatiles escape. Thus, a vented extruder can extract volatiles from the extrudate in a continuous fashion. Instead of the extraction of volatiles, one can use the vent port to add certain components to the polymer, such as additives, fillers, reactive components, etc. One of the main problems that vented extruders are plagued with is vent flow. This is a situation where not only the volatiles are escaping through the vent port, but also some amount of polymer. Thus, the extruder screw has to be designed in such a way that there will be no positive pressure in the polymer under the vent port (extraction section). This has led to the development of the two-stage vented extruder screw, especially designed for devolatilizing extrusion. It may be looked upon as two screws, one following the other. Typically, a two-stage vented extruder screw comprises a first or rear stage comprising the feed section 16, a first transition section 19, and a first metering section 21 with or without intervening sections. The second or front stage comprises a second transition section 24 and second metering section 25 with or without intervening sections. The two stages are separated by a section with a deep channel, sometimes referred to as a decompression or vent section 26. The channel depth of the decompression section is at least about 2 times larger than the channel depth of the first metering section, preferably at least about 2.5 times, more preferably at least about 3 times, even more preferably at least about 3.5 times, even more preferably at least about 4 times, even more preferably at least about 4.5 times, and most preferably at least about 5 times larger than the channel depth of the first metering section.

Lower bulk density polymeric material having a starting volume equivalent to a higher bulk density material before plastication will occupy less volume when melted. During extrusion of low bulk density polymeric materials the rates of solids feeding from the hopper and solids conveying in the screw feeding section are often inadequate in conventional extruders to properly fill the screw as the material is compressed during plastication and often results in under-supplying the screw. In the present invention, preferably, the thermoplastic material comprising a low bulk density polycarbonate material flows into the extruder from a constant level hopper through a feed throat and into the channels of the screw feeding section by gravity. In this case the extruder is said to be flood fed and the screw will take as much resin as will fall into it. Optionally, the hopper can be empty and the thermoplastic material comprising a low bulk density polycarbonate may be dropped through the hopper through the feed throat and into the channels of the screw such that whatever falls in is taken away. In this case the extruder is said to be starve fed.

Some low bulk density polymeric materials have very poor flow characteristics and additional devices may be required to ensure steady flow into the extruder. Sometimes this can be a vibrating pad attached to the hopper to dislodge any bridges (buildup of overheated resin in the feed throat which stop flow of the polymeric material) as soon as they form. In some cases, stirrers are used in the hopper to mix the material and/or wipe material from the hopper wall. Crammer feeders are sometimes used for low bulk density materials which are hard to handle. Often, low bulk density materials tend to entrap air. If the air cannot escape through the feed hopper, it will be carried with the polymeric material and eventually appear at the die exit. One solution to overcome this air entrapment problem is to use a vacuum feed hopper. Another solution is using a vented extruder.

An important bulk material property with respect to the design of a hopper is the angle of internal friction as described in "Polymer Extrusion", C. Rauwendaal, 1990, page 168–170. Typically feed hoppers have a cylindrical top section and a truncated conical section at the bottom. Preferably, the angle of the side wall of the hopper to horizontal, sometimes referred to as cone angle 27, should be larger than the angle of internal friction. If a polymeric material has a very large angle of internal friction, it will bridge in essentially every conventional hopper. The cone angle is the included angle measured from the horizontal plane of the barrel to the conically shaped side of the hopper. To improve the flow of low bulk density polymeric material the cone angle in the present invention is at least about 30°, preferably at least about 35°, more preferably at least about 40°, and most preferably at least about 45°. To improve the flow of low bulk density polymeric material the cone angle is less than about 80°, preferably less than about 70°, more preferably less than about 60°, and most preferably less than about 50°.

Preferably the feed throat is cut in the barrel wall or is included in a separate steel casing immediately to the rear of the main barrel. The opening can be any shape, preferably square, round, or more preferably rectangular or oblong. If the opening is rectangular or oblong, it can be described by its aspect ratio, or the ratio of its length to its width where the length is in the direction parallel to the length of the barrel and the width is in the direction perpendicular to the length of the barrel. In the present invention, the width of the feed throat opening is at least 1 times the inside diameter (D) of the barrel 28 (1D), preferably at least about 1.25D, more preferably 1.5D, even more preferably 1.75D, and most preferably 2D. To compensate for the reduced solids per volume of a low bulk density material it has been found beneficial for the feed throat opening to have an aspect ratio of greater than about 1, preferably greater than about 1.1, more preferably greater than about 1.2, even more preferably greater than about 1.3, even more preferably greater than about 1.4, and most preferably greater than about 1.5. To compensate for the reduced solids per volume of a low bulk density material it has been found beneficial for the feed throat opening to have an aspect ratio less than about 4, preferably less than about 3.5, more preferably less than about 3, even more preferably less than about 2.5, and most preferably less than 2.

When polymeric material is plasticated in an extruder, the plastication mechanism involves compacting the material to obtain frictional contact of the material with the interior wall of the barrel. Materials of high bulk density can not be compacted as easily or readily as those of lower bulk density, and conditions which are appropriate for the compaction of one material are often not appropriate for another material or for a mixture containing that other material. In the present invention, for low bulk density polycarbonate materials, it has been found preferable to employ a feed section having a relatively deeper screw root depth and/or greater screw lead and/or greater length than normally employed, thereby increasing the volumetric throughput rate through the feeding section to compensate for the lower bulk density of material being processed.

It has been found most preferable that the feeding section be modified to improve its throughput rate in handling low bulk density polycarbonate materials by having a constant root channel depth greater than found in a normal screw. But, the depth is limited by the strength of the metal in the root diameter part of the screw. The stress on the metal is highest in the feed section because the power for melting and pumping must be transferred down the screw and this is the smallest part of the screw shaft. In the instant invention, preferably the root channel depth is at least about 10 percent of the screw diameter, preferably at least about 12 percent, more preferably at least about 14 percent, even more preferably at least about 16 percent, and most preferably at least 18 percent of the screw diameter. Preferably the root channel depth is less than about 35 percent of the screw diameter, preferably less than about 30 percent, more preferably less than about 25 percent, even more preferably less than about 22.5 percent, and most preferably less than about 20 percent of the screw diameter.

Most screws are square pitch, which means that the screw lead is the same as the diameter, such a screw has a screw lead to diameter ratio of 1. In the present invention, to further increase the volume of polymeric material brought into an extruder the screw lead to diameter ratio in the feed section is greater than 1.0, more preferably greater than about 1.25, even more preferably greater than about 1.5, and most preferably greater than about 1.75. Further, a preferable screw lead to diameter ratio is less than about 3.0, preferably less than about 2.75, more preferably less than about 2.5, more preferably less than about 2.25, and most preferably less than about 2.0.

In the present invention, increasing the length of the feed section of the screw improves the throughput rate in the handling of low bulk density polycarbonate. The length of the feed section can be at least 4 turns of the screw, preferably 5 turns, more preferably 5.5 turns, even more preferably 6 turns, and most preferably 6.5 turns. The feed section of the screw is preferably equal to or less than 15 turns of the screw, more preferably equal to or less than 12 turns, more preferably equal to or less than 10 turns, even more preferably equal to or less than 8 turns, and most preferably equal to or less than 7 turns.

In a two-staged screw, each stage has a transition section. Preferably, the first 19 and second 24 transition sections are successively positioned downstream from the feed section 16 in the first and second stages, respectively. A decompression section 26 is located on the screw between the first and second transition sections. Preferably, the screw root depth in the transition section successively decreases from the screw root depth of the adjacent upstream section to the screw root depth of the adjacent downstream section. In a two-stage screw, the compression ratio for one transition section can be the same or different as the compression ratio for the other transition section. In the instant invention, preferably the compression ratio of each transition section is at least about 2:1, more preferably at least about 2.5:1, even more preferably at least about 3:1, even more preferably at least about 3.5:1, even more preferably at least about 4:1, even more preferably at least about 4:5, and most preferably at least about 5:1. Preferably the compression ratio of each transition section is less than about 15:1, more preferably less than about 13:1, even more preferably less than about 12:1, even more preferably less than about 11:1, and most preferably less than about 10:1. The length of the first transition section can be at least 4 turns of the screw, preferably 5 turns, more preferably 5.5 turns, even more preferably 6 turns, and most preferably 6.5 turns. The first transition section of the screw is preferably equal to or less than 15 turns of the screw, more preferably equal to or less than 12 turns, more preferably 10 turns, even more preferably 8 turns, and most preferably 7 turns.

The first 19 and second 24 transition sections are followed downstream, with or without intervening sections, by first 21 and second 25 metering sections, respectively. In a vented extruder screw, the second stage must take away what the first stage delivers into the decompression section, so the channel depth in the second stage metering zone must be greater than the channel depth in the first stage metering zone. Otherwise, the polymeric material will come up the vent; this is sometimes referred to as vent flow. In the present invention, the ratio of second to first metering section channel depths is greater than 1, preferably greater than about 1.1, more preferably greater than 1.15, even more preferably greater than about 1.2, and most preferably greater than about 1.25. Preferably, the ratio of second to first metering section channel depths is less than about 2, preferably less than about 1.8, more preferably less than about 1.6, even more preferably less than about 1.4, and most preferably less than about 1.3. The length of each metering section is at least about 2 turns, preferably at least about 3 turns, more preferably at least about 3.5 turns, even more preferably at least about 4 turns, and most preferably at least about 4.5 turns. The length of each metering section is less than about 10 turns, preferably less than about 8 turns, more preferably less than about 6 turns, even more preferably less than about 5.5 turns, and most preferably at least less than about 5 turns. Optionally, for high resistance a melt pump may be employed.

Optionally, the vented extruder screw of the instant invention comprises a mixing section 30. Mixing sections are well known. Preferably, mixing sections comprise dispersive mixing elements and/or distributive mixing elements. Typically, dispersive mixing sections are used when agglomerates or gels need to be broken down. Examples of dispersive mixing sections are UC (Maddock) Mixing Section, Egan Mixing Section, Dray Mixing Section, and Blister Ring to name a few. Typically, distributive mixing sections are used where different polymers are blended together with viscosities reasonably close together. Essentially any disruption of the velocity profiles in the screw channel will cause distributive mixing. Examples of distributive mixing sections are Pin Mixing Section, Dulmage Mixing Section, Saxton Mixing Section, Pineapple Mixing Section, Slotted Screw Flight, and Cavity Transfer Mixing Section to name a few. One or more mixing sections are located downstream from the feed section, preferably downstream from the first and/or second metering sections.

At the output end of the extruder screw is a steel block, sometimes referred to as a die 22, with a passage through it that ends in one or more openings that form the final shape of the extrudate. Depending on the design of the die, products with many kinds of shapes can be produced. Some dies produce strands or pellets. Two methods are used for making pellets. In one, a strand about 0.125 inch in diameter is extruded and after cooling, usually in a water bath, is cut in lengths of about 0.125 inch. In the other, the die opening is under water and a fast rotating knife almost touching the die cuts the melt into almost spherical pieces, sometimes referred to as beads, as it comes out of the die. Examples of other common shaped products are pipe, which is generally defined as material over 0.5 inch in diameter with a rigid wall; film, which is defined by convention as being less than 0.01 inch thick; sheet, which is material over 0.01 inch in thickness; and the extrusion of special shapes such as table edges, window channels, automobile trim, tapes, rods, filaments, and all type of contours is referred to as profile extrusion and the products generally as profiles.

The area between the tip of the extruder screw 18 and the die comprises the head zone 31. Preferably there are one or more screens 32 and a heavy metal disc, sometimes referred to as a breaker plate 33, located in this area. Preferably, between the breaker plate and the die is an adapter 36 which is the connecting piece through which the extrudate flows from the extruder barrel to the die. Optionally, the single screw extruder comprises a melt pump which is preferably located between the breaker plate and the adapter. In the present invention, the head zone melt pressure, sometimes referred to as discharge pressure, is preferably measured at the tip of the screw just before the screens 35 and/or preferably in the adapter near the die-face 36. When the head zone pressure is measured near the die-face it is sometimes referred to as die-face pressure. Any suitable pressure gauge can be employed.

Fluctuations in die-face pressure cause variations in the flow rate through the die. At constant take-up speed, this will cause fluctuations in the dimensions of the extrudate sometimes referred to as surging. Surging may cause undesirable thickness variations in the product, but not necessarily in direct proportions to the pressure variations. Increases in pressure are caused by several things, to name a few, an increase in screw speed, a decrease in melt temperature, contamination, a change in throughput rate, or a change in viscosity of the polymeric material. Decreases in pressure can be caused by the opposite things as well as decreasing the feed to the screw. In the instant invention, a head zone pressure, preferably die-face pressure, variation of less than about 20 percent (±10 percent above or below the average pressure) is preferable for controlling thickness in the product, a variation of less than about 18 percent (±9 percent) is more preferable, a variation of less than about 16 percent (±8 percent) is even more preferable, a variation of less than about 14 percent (±7 percent) is even more preferable, a variation of less than about 12 percent (±6 percent) is even more preferable, a variation of less than about 10 percent (±5 percent) is even more preferable, a variation of less than about 8 percent (±4 percent) is even more preferable, a variation of less than about 6 percent (±3 percent) is even more preferable, a variation of less than about 4 percent (±2 percent) is even more preferable, and a variation in die-face pressure of less than about 2 percent (±1 percent) is most preferable for controlling thickness in the product.

To illustrate the practice of this invention, examples of preferred embodiments are set forth below. However, these examples do not in any manner restrict the scope of this invention.

A Breyer two-stage vented single screw extruder was used in the examples to make polycarbonate sheet. The extruder had a circular hopper with a 45° included cone angle and a feed throat opening with an aspect ratio greater than 1 and a length of 1.5 times the screw diameter. The diameter of the screw was 90 mm and it had a 39:1 length/diameter (L/D) ratio. The barrel type was longitudinal grooved with water cooling. The maximum motor power was 110 kilowatts (kW) and the maximum screw speed was 130 revolutions per minute (rpm). The die width was 900 millimeters (mm). The screw configuration is shown in Table 1.

The following were the barrel temperatures set points: 120° C. at the hopper, 300° C. at the feed section, 295° C. at the first transition and metering sections, 280° C. in the vent section, 285° C. in the second transition section, and 295° C. in the second metering section through the head zone to the die. The sheet die temperatures were set at 295° C. No screens were used. A vacuum in the vent section of 0.92 millibar (mbar) was achieved. The following were the roll temperatures set points: roll 1 was 120° C., roll 2 was 125° C., and roll 3 was 130° C. The following were the roll speed set points: roll 1 was 0.993 meter/minutes (m/min.), roll 2 was 1.01 m/min., roll 3 was 1.014 m/min., and roll 4 was 1.007 m/min. The roll gap between roll 1 and roll 2 was 3.711 mm and the gap between roll 2 and roll 3 was 2.981 mm. The extruded sheet measured 885 wide mm by 3.05 mm thick.

TABLE 1

| Section | Channel Depth (mm) | Screw Lead (mm) | Root Diameter | Length (mm) | No. Parallel Channels | Compression Ratio |
|---|---|---|---|---|---|---|
| Feed | 19.05 | 114 | constant | 656 | 1 | — |
| 1st Transition | vary | 90 | taper | 600 | 1 | — |
| 1st Metering | 4.32 | 90 | constant | 483 | 1 | 4.41 |
| Mixing | — | — | blister | 76.2 | — | — |
| Vent | 18 | 90 | constant | 450 | 2 | — |
| 2nd Transition | vary | 90 | taper | 265.5 | 1 | 3.38 |
| 2nd Metering | 5.33 | 90 | constant | 916 | 1 | — |

The composition and properties of Experiments 1–6 are given in Table 2 below in parts by weight of the total composition. In Table 2:

"PC 1" is a virgin bisphenol-A polycarbonate having a 3 g/10 min. MFR, it is in flake form, and an average bulk density of 0.19 g/cm$^3$;

"PC 2" is a virgin bisphenol-A polycarbonate having a melt flow rate (MFR), as determined by ASTM D 1238, at conditions of 300 ° C. and an applied load of 1.2 kg, of 3 grams per 10 minutes (g/10 min.), it is in pellet form, and has an average bulk density of 0.67 g/cc$^3$; and "PC 3" is recycle polycarbonate sheet (regrind) with an average bulk density of 0.5 g/cm$^3$.

The polycarbonate materials in Experiments 1 to 4 were flood fed and the polycarbonate materials in Experiments 5 and 6 were starve fed.

The head zone pressure was determined before the screen packs.

Optical testing was done on a Hunterlab ColorQUEST sphere spectrocolorimeter. The instrument has a viewing angle of 8 degrees from specimen normal and port size of 25 mm diameter. Illumination is by a diffuse 15.2 cm diameter sphere coated with barium sulfate and illuminated with simulated CIE D65 spectral distribution, filtered to eliminate infrared specimen heating.

Percent transmission is measured according to ASTM D 10003-61 on specimens cut from extruded sheet. Specimen size was 50 mm by 80 mm. The value reported is the total luminous transmittance, defined in ASTM E 308 as the ratio of the transmitted to the incident light.

Yellowness index (YI) is defined in ASTM D 1925 and is calculated from the tristimulus values, measured by the spectrocolorimeter, according to the following formula:

$$YI=[100(1.28X_{CIE}-1.06Z_{CIE})]/Y_{CIE}$$

The polycarbonate resins were pre-dried in a hopper dryer for a minimum of one hour at 100° C. The hopper was fitted with the capability to purge nitrogen through the polycarbonate material. Liquid tint was added drop wise directly into the hopper.

It can be seen from the test results in Table 2 that, when polycarbonate resin comprising one or more low bulk density polycarbonates of irregular shape are extruded into sheet, a desirable balance of throughput rate, pressure fluctuations, and sheet quality as determined by percent transmission and yellowness index is achieved.

It is within the skill in the art to practice this invention in numerous modifications and variations in light of the above teachings. It is, therefore, to be understood that the various embodiments of this invention described herein may be altered without departing from the spirit and scope of this invention as defined by the appended claims.

TABLE 2

| | Experiment | | | | | |
|---|---|---|---|---|---|---|
| | 1 | 2 | 3 | 4 | 5 | 6 |
| Composition, weight percent | | | | | | |
| PC 1 | 100 | 90 | 80 | 70 | 50 | — |
| PC 2 | — | 10 | 20 | 30 | 50 | — |
| PC 3 | — | — | — | — | — | 100 |
| Throughput Rate, kilogram per hour (kg/hr.) | | | | | | |
| @ 70 rpm | 176 | — | — | — | — | 278 |
| @ 80 rpm | 187 | 200 | 255 | | | |
| @ 90 rpm | 196 | 219 | — | 290 | 300 | — |
| @ 100 rpm | 239 | — | — | — | — | — |
| @ 110 rpm | 258 | — | — | — | — | — |
| Head Zone Pressure, bars | 165 ± 5 | 125 ± 5 | 148 ± 8 | — | 149 ± 6 | 120 ± 5 |
| Melt Temperature, ° C. | 318 | 322 | 322 | — | 328 | 319 |
| Pre-dried at 100° C. | yes | no | yes | yes | no | yes |
| Nitrogen Purge at Feed | no | yes | yes | yes | yes | no |
| Liquid Tinting | no | no | no | yes | yes | no |
| Sheet Quality Results | | | | | | |
| Percent Transmission | 92.1 | 92 | 91.7 | 91.3 | 90.7 | 91.3 |
| Yellowness index | 1.18 | 1.09 | 1.54 | 1.08 | 1.88 | 1.69 |

What is claimed is:

1. A method of plasticating and extruding a thermoplastic material comprising a polycarbonate having a bulk density in the range of about 0.15 g/cm$^3$ to about 0.4 g/cm$^3$ into a sheet, profile, or film comprising the steps of:
   (a) introducing the thermoplastic material into a single screw extruder comprising a conventional frame means, a hopper, vented barrel with a feed throat opening, a two stage extruder screw contained therein and optionally a melt pump; wherein the two stage screw extruder comprises,
   (i) a feed section having a screw lead to diameter ratio greater than about 1 and a constant channel depth of at least about 12 percent of the screw diameter,
   (ii) a transition section having a compression ratio of at least 3:1 and a length of at least 5 turns, (iii) a first metering section which is at least about 3 turns long,
(iv) optionally, a mixing section,
(v) a venting section,
(vi) a second transition section, and
(vii) a second metering section (b) extruding a plasticated thermoplastic material through a sheet die, profile die, or film die, and (c) recovering a thermoplastic sheet, profile, or film.

2. The method of claim 1 further comprising the step of mixing the plasticated material in a mixing section of the two-stage extruder screw.

3. The method of claim 1 further comprising the step of passing the plasticated material through a melt pump prior to the die.

4. The method of claim 1 wherein the polycarbonate is irregularly shaped.

5. The method of claim 4 wherein the irregularly shaped polycarbonate has a density in the range of about 0.16 g/cm$^3$ to about 0.36 g/cm$^3$.

6. The method of claim 4 wherein the irregularly shaped polycarbonate has a density in the range of about 0.18 g/cm$^3$ to about 0.32 g/cm$^3$.

7. The method of claim 4 further comprising a second polycarbonate having a density in the range of about 0.5 g/cm$^3$ to about 1.2 g/cm$^3$.

8. The method of claim 7 wherein the second polycarbonate has a density in the range of about 0.55 g/cm$^3$ to about 0.75 g/cm$^3$.

9. The method of claim 4 wherein the irregularly shaped polycarbonate is an agglomerate and porous in nature with its longest dimension in the range of about 1 mm to about 50 mm with an average dimension of about 8 mm to about 12 mm.

10. The extruded film of claim 1 is polycarbonate film.

11. The extruded profile of claim 1 is polycarbonate profile.

12. The extruded sheet of claim 1 is polycarbonate sheet.

13. The method of claim 1 further comprising the steps of:

(a) feeding the thermoplastic material through the hopper, said hopper having an included cone angle of at least about 30° and (b) passing the thermoplastic material from the hopper through the feed throat opening in the barrel, said opening having an aspect ratio greater than about 1 and width of at least about 1 times the inside diameter of the barrel.

* * * * *